Dec. 17, 1968 P. R. HELM ET AL 3,416,622
METHOD FOR STABILIZING A CRAWLER CRANE
Original Filed Sept. 30, 1963
4 Sheets-Sheet 4
FIG. 5
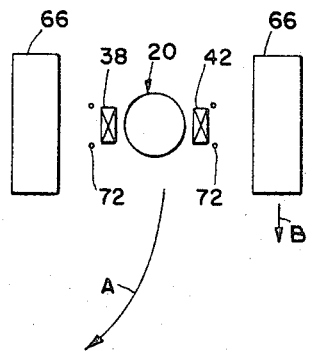
FIG. 10
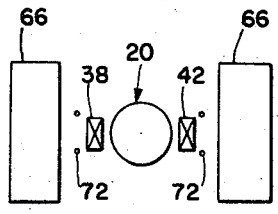
FIG. 6
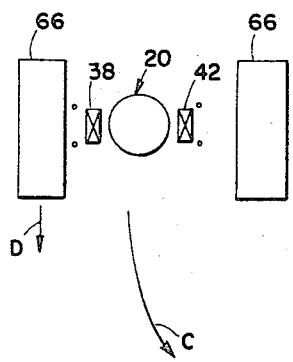
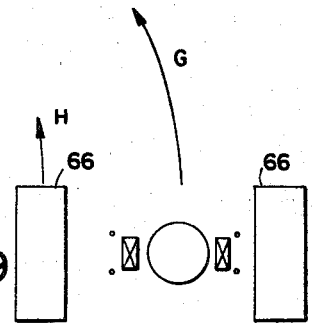
FIG. 9
FIG. 7
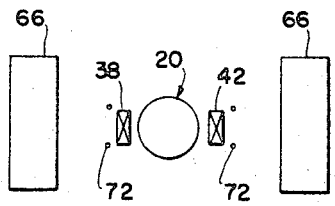
FIG. 8
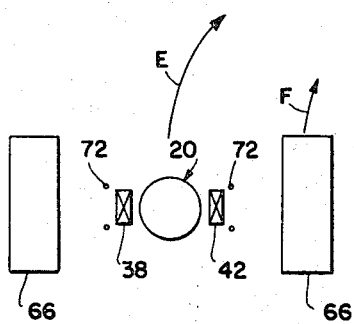
INVENTORS
PERCY R. HELM
CARL O. LEWIS

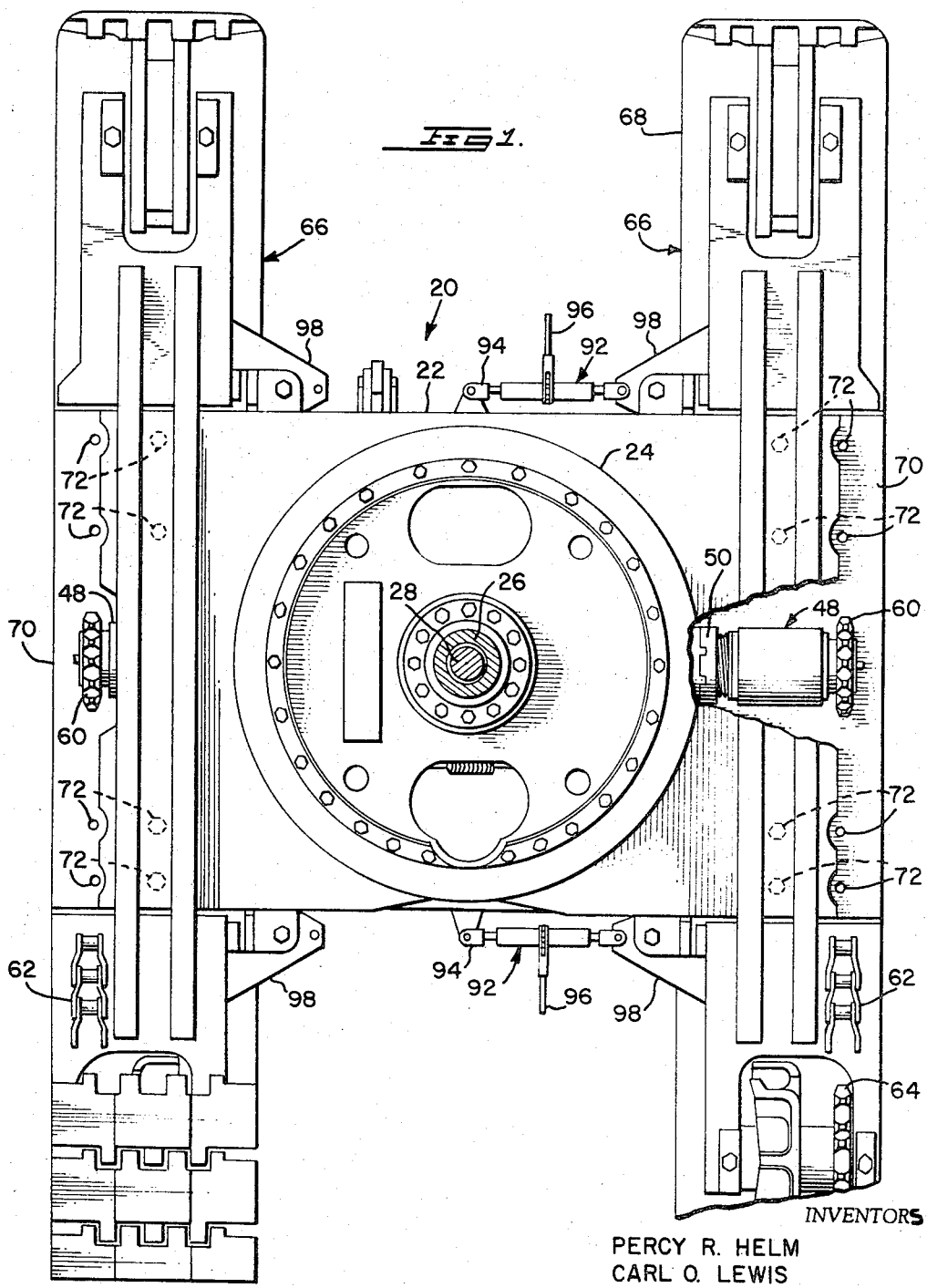

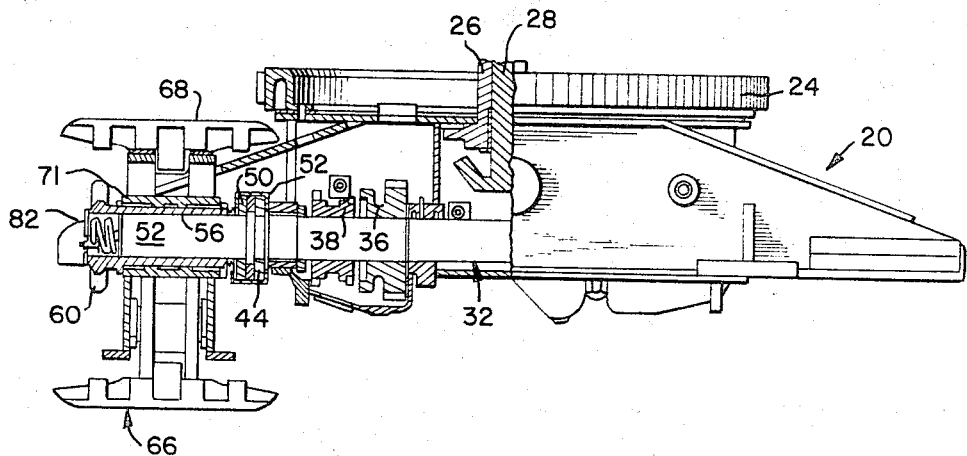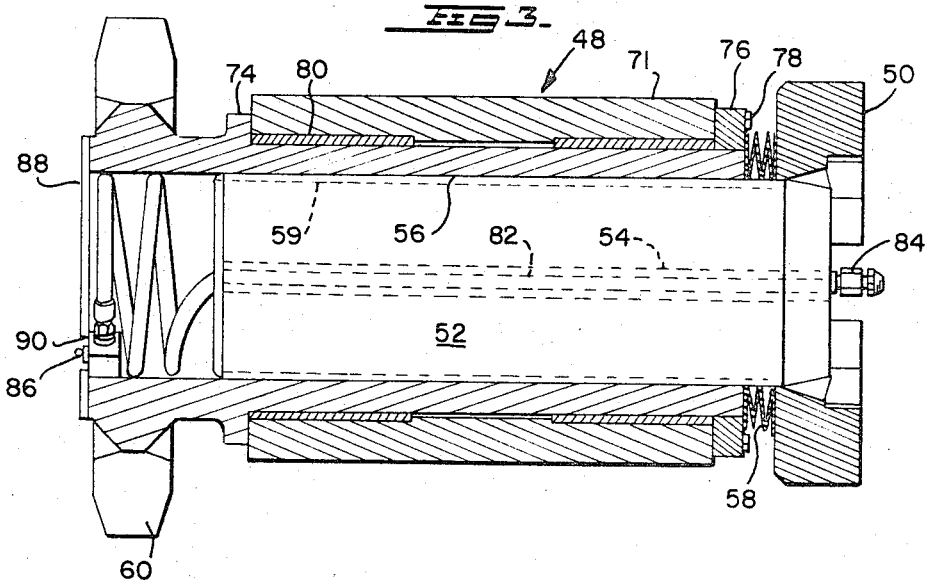

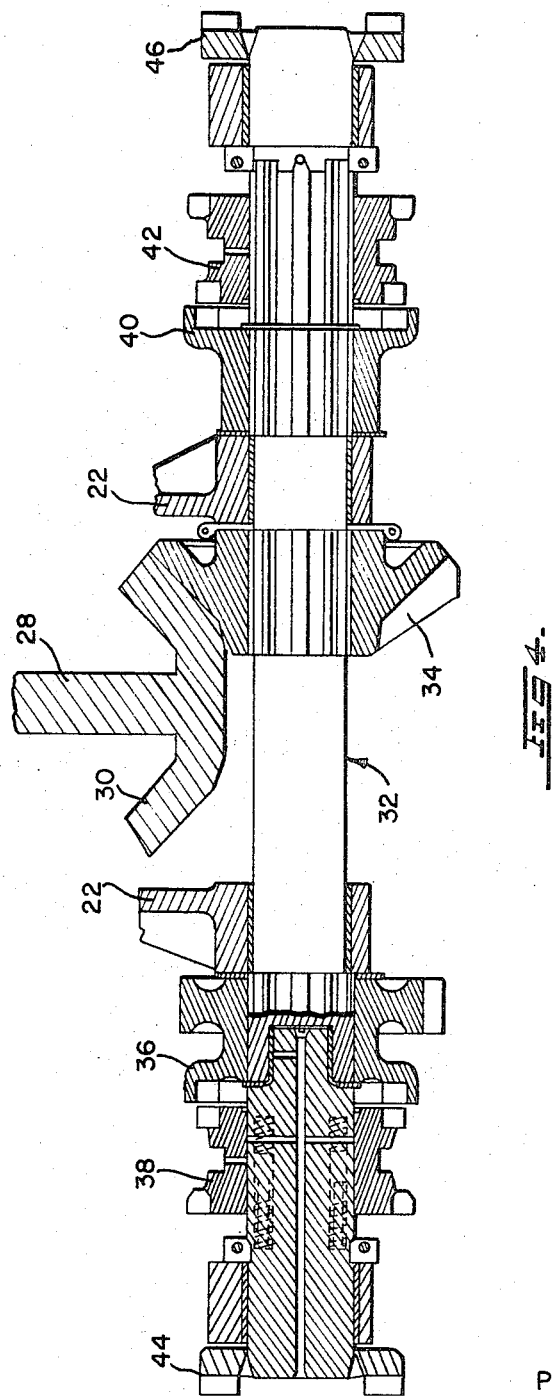

United States Patent Office 3,416,622
Patented Dec. 17, 1968

3,416,622
METHOD FOR STABILIZING A CRAWLER CRANE
Percy R. Helm, Rte. 4, and Carl O. Lewis, 1009 N. 12th St., both of Manitowoc, Wis. 54220
Original application Sept. 30, 1963, Ser. No. 312,413, now abandoned. Divided and this application Nov. 7, 1966, Ser. No. 606,483
11 Claims. (Cl. 180—6.7)

ABSTRACT OF THE DISCLOSURE

A vehicle having a crawler type traction assembly which is stabilized by increasing and decreasing the distance between the traction assemblies when desired. The distance between the assemblies is changed by driving an assembly on one side of the vehicle relative to an assembly on the other side of the vehicle.

---

This is a division of copending application Ser. No. 312,413, filed Sept. 30, 1963, now abandoned.

The present invention relates, generally, to a method and apparatus for stabilizing vehicles of the industrial type by adjusting the tread thereof.

More particularly, this invention pertains to a method and apparatus for stabilizing self-propelled vehicles of the industrial type, for example, crawler cranes, tractors, and etc., by adjusting the tread thereof.

Heretofore, it has been suggested that vehicles of the industrial type, for example, crawler cranes, tractors, and etc., be provided with a mechanism for adjusting the tread thereof, that is a mechanism for increasing or decreasing the transverse dimensional extent or width of the vehicle, or the distance between the crawler assemblies. However, due to the type of vehicle concerned, heretofore suggested adjusting mechanisms are extremely complex, bulky, difficult to operate, thus consuming excessive amounts of time, and often requiring repair.

Additionally, heretofore suggested mechanisms for adjusting the tread of vehicles of the industrial type require the use of additional elements, thus presenting a vehicle having a lower works comprised of a plurality of separate component parts. As a result, existing vehicles are not of a unitary or rigid body construction. For example, it has been suggested that a spacer be positioned between the car body of a crawler crane and the crawler assemblies thereof, when it is desired to increase the tread thereof and stabilize the vehicle. When it is desired to decrease the tread, the spacers are removed. The car body of such vehicles is, therefore, a separate component part relative to the crawler assemblies, and the lower works, comprising the car body and the crawler assemblies, is not of a unitary or rigid construction.

Accordingly, with the above disadvantages in mind, it is a primary object of the present invention to provide a method and apparatus for stabilizing vehicles of the industrial type, for example, crawler cranes, tractors, and etc., by adjusting the tread thereof, that is, increasing or decreasing the transverse dimensional extent or width of the vehicle, or the distance between the crawler assemblies thereof, while simultaneously presenting a lower works, comprising, at least in part, a car body and the crawler assemblies, of a unitary or rigid construction.

Another primary object of this invention is to provide a method and apparatus for stabilizing self-propelled vehicles of the industrial type, for example, crawler cranes, tractors, and etc., by selectively automatically adjusting the tread thereof, that is, increasing or decreasing the transverse dimensional extent or width of the vehicle, or the distance between the crawler assemblies thereof, while simultaneously presenting a lower works, comprising, at least in part, a car body and the crawler assemblies, of a unitary or rigid construction.

A further primary object of the present invention is to provide a method and apparatus for stabilizing self-propelled vehicles of the industrial type, for example, crawler cranes, tractors, and etc., by automatically adjusting the tread thereof, that is, increasing or decreasing the transverse dimensional extent or width of the vehicle, or the distance between the crawler assemblies thereof, while simultaneously presenting a lower works, comprising, at least in part, a car body and the crawler assemblies, of a unitary or rigid construction, the increase or decrease in tread being unusually readily accomplished by steering the vehicle by the driving thereof.

A still further primary object of this invention is to provide a method and apparatus for stabilizing self-propelled vehicles of the industrial type, for example, crawler cranes, tractors, and etc., by unusually efficiently mechanically adjusting the tread thereof, that is, increasing or decreasing the transverse dimensional extent or width of the vehicle, or the distance between the crawler assemblies thereof, while simultaneously presenting a lower works, comprising, at least in part, a car body and the crawler assemblies, of a unitary or rigid construction.

Still another primary object of the present invention is to provide a method and apparatus of stabilizing a crawler crane by adjusting the tread thereof, that is, increasing or decreasing the transverse dimensional extent or width of the vehicle, or the distance between the crawler assemblies thereof, while simultaneously presenting a lower works, comprising, at least in part, a car body and the crawler assemblies, of a unitary or rigid construction, said apparatus comprising a simple, durable, and unusually efficiently operable longitudinally adjustable telescoping assembly.

Other objects and important features of the invention will be apparent from a study of the specification following, taken with the drawings, which together show, illustrate, describe and disclose a preferred embodiment or modification of the invention and what is now considered to be the best mode of practicing the principles thereof.

In the drawings:

FIGURE 1 is a plan view of a crawler crane, illustrating certain assemblies and component parts for adjusting the tread thereof in accordance with the present invention;

FIGURE 2 is a detailed view, partially in elevation, and partially in section, illustrating the crawler crane of FIGURE 1;

FIGURE 3 is a detailed view, partially in section and partially in elevation, and drawn to an enlarged scale, illustrating a longitudinally adjustable telescoping assembly constructed in accordance with the present invention, and incorporated in the crawler crane of FIGURES 1 and 2 for adjusting the tread thereof;

FIGURE 4 is a detailed view, partially in section and partially in elevation, and drawn to an enlarged scale, illustrating the horizontal travel shaft drive assembly for driving the crawler assemblies of the crawler crane of FIGURES 1 and 2;

FIGURE 5 is a schematic plan view of a crawler crane constructed in accordance with the present invention, and illustrating a first position in the sequence of automatically adjusting the tread thereof by steering by driving;

FIGURE 6 is a view similar to FIGURE 5, illustrating another position in the sequence of adjusting the tread;

FIGURE 7 is a view similar to FIGURES 5 and 6, illustrating still another position in the sequence, in which position the extent of the tread is a maximum;

FIGURE 8 is a view similar to FIGURE 7, illustrating a first position in the sequence of adjusting the tread to the position of FIGURE 5;

3

FIGURE 9 is a view similar to FIGURE 8, illustrating another position in the sequence of adjusting the tread to the position of FIGURE 5; and FIGURE 10 is a view similar to FIGURES 8 and 9, illustrating that position in the sequence in which the tread has been returned to the position of FIGURE 5.

Referring now to the drawings, and particularly to FIGURE 1, there is illustrated therein the lower works 20 of, for example, a crawler crane, which may be of any conventional type. The lower works 20 comprises a car body 22 having positioned thereupon, in any suitable manner, and a ring gear assembly 24, the same being structurally operatively associated, in use, with the conventional upper works (not shown) of the crane.

Extending generally vertically through the ring gear assembly 24 is a king pin and vertical travel shaft assembly 26. The vertical travel shaft assembly is centrally bored, and a travel drive pinion gear shaft 28 extends therethrough. Propelling of the lower works 20 can be affected in any suitable manner and, for example, can be affected with the drive pinion (not shown) of a gasoline engine, diesel engine, or the like, in mesh with a driven pinion (not shown) operably associated with or connected to the shaft 26. If desired, the king pin and vertical travel shaft assembly 26 and the travel drive pinion gear shaft 28 can be so consituted and arranged as to have certain fluid power operations, for example, power steering, affected by suitable controls in the upper works (not shown) of the crane.

Structurally operatively associated with or connected to the shaft 28 is a travel drive pinion gear 30. The pinion gear is mutually cooperatively engageable with, and affects the operation of a horizontal travel shaft drive assembly 32 by mutual cooperative engagement with the travel bevel gear 34 thereof. The travel shaft drive assembly 32 may be of any suitable conventional construction and is rotatably positioned relative to the car body 22 of the crane in any suitable manner. Generally, the assembly 32 comprises a left travel steering clutch jaw 36 that is mutually cooperatively engageable with a corresponding travel drive steering clutch 38 and a right travel steering clutch jaw 40 that is mutually cooperatively engageable with a corresponding travel drive steering clutch 42. The steering clutches 38 and 42 are shown, in FIGURE 4, in a neutral position. It is to be understood that each clutch normally is engaged, that is, positioned inwardly of the position illustrated in that figure, and that either one, but not both, can be moved to the neutral position illustrated therein at any one time. When one of the clutches 38 or 42 is disengaged, or in the neutral position as illustrated in FIGURE 4, a gradual turn about the disengaged clutch can be affected. This will be more fully described hereinafter.

Further, the travel shaft drive assembly 32 comprises a left travel or driving clutch 44 and a right travel or driving clutch 46. Each travel or driving clutch is mutually cooperatively engageable with a longitudinally adjustable telescoping assembly or apparatus 48, and, in particular, is mutually cooperatively engageable with the driven clutch 50 thereof. A clutch retainer 52, of any suitable construction, retains the driving clutch 44 and the driven clutch 50 in mutual cooperative engagement with one another. The clutches 44 and 50 may be disengaged by removing the clutch retainers 52 for purposes of removing a plurality of crawler assemblies, to be more fully described hereinafter, from the lower works 20 when it is desired to ship the crane from one point of use to another.

With particular reference now to FIGURE 3, the longitudinally adjustable telescoping assembly 48 comprises a generally cylindrically configured solid shaft 52 integrally structurally cooperatively associated with or connected to the clutch 50. The shaft 52 has a bore 54 extending completely longitudinally therethrough and disposed generally centrally thereof, for a purpose to be described more fully hereinafter. The shaft 52, further, is longitudinally slidable of and relative to a generally cylindrically configured tubular sleeve 56. To insure smooth relative longitudinal reciprocal movements of the shaft 52 relative to the sleeve 56, a bellows 58 is structurally operatively associated therebetween or connected thereto, which bellows may be fabricated of any suitable material and in any suitable manner. Additionally, while the shaft 52 and the sleeve 56 are longitudinally reciprocally moveable relative to one another, it is desirable that relative rotation therebetween be precluded. To this end, there is provided the longitudinal splined connection 59 between the sleeves and the shaft.

A crawler tread driving sprocket 60 is fixedly positioned, in any suitable manner, upon and relative to the end of the sleeve 56 opposite the end thereof adjacent the clutch 50. The driving sprocket 60 is mutually cooperatively engageable with a crawler tread drive chain 62, particularly illustrated in FIGURE 1, which, in turn, is mutually cooperatively engageable with a crawler tread driven sprocket 64. The drive chain 62 and the driven sprocket 64 comprise, at least in part, a crawler assembly 66 and, in accordance with this construction, it can be seen that operation of the driving sprocket 60 causes operation of the chain 62 which, in turn, causes operation of the driven sprocket 64 and a crawler tread 68.

Each of the crawler assemblies comprise, further, a crawler frame 70 which is structurally operatively associated with or connected to the car body 22 by a plurality of removable or disengageable crawler frame nut and tie bolt assemblies 72, disposed in a plurality of rows transversely of the lower works 20. Each of the assemblies 72 may comprise, for example, a plurality of apertures in each row and in each of the car body 22 and the crawler frames 70, which apertures are capable of being vertically aligned relative to one another, and a bolt of any suitable construction, positionable within the vertically aligned apertures, to maintain the crawler assemblies 66 and the crawler frame 70 thereof in one of the plurality of positions laterally of and relative to the car body, enabling the tread of the lower works 20 of the crane to be adjusted. As illustrated, two assemblies 72 in each row located at each crawler assembly 66 presents each assembly with a corresponding number, namely, two, lateral positions relative to the car body. It is to be understood, however, that the assemblies 72 may take any suitable form, keeping in mind the requirement that they be readily removable or disengageable, in any suitable manner, for adjusting the tread of the lower works.

With particular reference again to FIGURE 3, the longitudinally adjustable telescoping assemblies 48 are each of them structurally operatively associated with or connected to a portion 71 of a corresponding one of the crawler frames 70 in any suitable manner, as by providing the sleeve 56 with an integral collar 74 and another collar 76 fixedly associated with the sleeve 56, as by press-fitting the same relative thereto. The collar 76 is fixedly positioned in abutting relationship relative to the frame 70, for example, by a conventional fastener 78, thus precluding relative longitudinal movement between the frame 70 and the sleeve 56. Suitable bearings or bushings 80 are disposed between the frame 70 and the sleeve 56.

A grease line 82, of any suitable configuration, is positioned within each of the assemblies 48, and, in particular, is disposed to extend through the bore 54 thereof. The grease lines 82 comprise a suitable fitting 84 for connection to a suitable source of lubricant supply (not shown), and an outlet fitting 86, of any suitable construction, for supplying lubricant to each of the crawler assemblies 66. A cover plate 88 is fixedly positioned upon that end of the sleeve 56 adjacent the driving sprocket 60, for closing that end of the sleeve, which cover plate is provided with an aperture 90 cooperating with the outlet fitting 86.

From the above, it can be seen that each of the crawler assemblies 66 are movable laterally outwardly of and relative to the car body 22 of the lower works 20. This is especially true in view of the longitudinal reciprocally movable relationship between the sleeve 56 and shaft 52 of each of the assembles 48.

Lateral movement of each of the crawler assemblies 66 outwardly and inwardly of and relative to the car body 22 may be accomplished manually, and, to this end, the lower works 20 may be provided with a plurality of manually operable ratchet jacks 92, pivotally connected to the car body 22 at pivot locations 94, and provided with a suitable handle 96. Each of the ratchet jacks or devices 92 are connectable to another portion 98 of each of the crawler frames 70. Thus, once one of the crawler assemblies 66 has been adjusted laterally of the car body 22, and it is desired to adjust the other assembly laterally of the body, the jacks or jack devices 92 are pivoted 180 degrees about their respective pivot points 94 and connected to the portions 98 of the frame 70 of the said other assembly 66. In addition, it is to be understood that the jacks or jack devices may be automatically hydraulically operable, as well as manually operable, and, therefore, the drawings are to be construed and interpreted as illustrating jacks or jack devices that are manually as well as automatically hydraulically operable. In the latter instance, suitable fluid supply connections from the upper works (not shown) of the crane would be provided to supply fluid to and exhaust fluid from each of the jacks or jack devices 92.

It will be noted that when the jacks 92, be they manually or automatically hydraulically operable, are caused to adjust either one or both of the assemblies 66 laterally of the car body 22, the removable crawler frame nut and tie bolt assemblies 72 must first be removed or disengaged. Subsequently, when the crawler assemblies have been laterally adjusted as desired, the assemblies 72 are once again disposed in place or engaged, to preclude undesired lateral movements of the crawlers relative to the car body 22.

Moreover, it will be understood that the lower works 20, comprising, at least in part, the car body 22 and the crawler assemblies 66 present a unitary or rigid construction, due to the provision of the longitudinally adjustable telescoping assemblies 48. That is, provision of the assemblies 48 connects the crawler assemblies 66 to the car body 22, and, at the same time, renders the crawlers laterally adjustable relative thereto, without requiring the use of any additional and separate elements that would affect a separation of the car body from the crawlers.

It will be further understood that a particular method for automatically adjusting the tread of the crawler assemblies 66, that is, increasing or decreasing the transverse dimensional extent or the width therebetween by steering by driving, has been developed, in accordance with the present invention. In this connection, reference is now made to FIGURE 5 through 7, wherein there is schematically illustrated the steps necessary to increase the tread of the crawler assemblies, and to FIGURES 8 through 10, wherein there is schematically illustrated the steps necessary to decrease the tread thereof.

With reference now to FIGURE 5 through 7, and first to FIGURE 5, the tread of the crawler assemblies 66 is illustrated as being at a minimum. Thus, the outermost aperture of the assemblies 72 on the crawler frames 70 is vertically aligned with the aperture through the car body 22. To increase the tread of the crawler assemblies 66, the steering clutch 38 is disengaged so that the crawler assembly 66 controlled thereby idles. In addition, the assemblies 72 corresponding to the other crawler 66 are disengaged. The lower works 20 is now driven to the position of FIGURE 6. In so doing, since the crawler 66 controlled by the clutch 38 is idling, the lower works 20 will pivot thereabout, as indicated by the arrow A. However, since the assemblies 72 corresponding to the other crawler 66 have been disengaged, that crawler will tend to move straight ahead, and outwardly of and relative to the car body 22, as indicated by the arrow B. When the lower works 20 has reached the position of FIGURE 6, it can be seen that the right crawler 66, as viewed in that figure, will automatically have been adjusted laterally outwardly of the lower works, this adjustment being facilitated by the longitudinally adjustable telescoping assembly 48 (not shown in these schematic illustrations). At this time, the assemblies 72 corresponding to the right crawler 66 are again engaged.

To adjust the left crawler 66, as viewed in FIGURE 6, laterally outwardly of the lower works 20, the steering clutch 42 is disengaged and the assemblies 72 corresponding to the left crawler 66 disengaged. Disengagement of the clutch 42 renders the right crawler idling, enabling the lower works 20 to pivot thereabout when the same is driven, as indicated by the arrow C, to the position of FIGURE 7. However, since the assemblies 72 corresponding to the left crawler have been disengaged, that crawler will tend to move straight ahead, and outwardly of and relative to the car body 22, as indicated by the arrow D, to the position of FIGURE 7. Once the lower works 20 has reached the position of that figure, it can be seen that the left crawler 66, as well, as illustrated therein, has been adjusted laterally outwardly of the lower works, at which time, the assemblies 72 corresponding thereto are once again engaged.

To adjust the tread of the crawlers 66 laterally inwardly of the lower works 20, the procedure is substantially the same as that above, with but one exception. In the above procedure, the assemblies 72 opposite the disengaged steering clutch are disengaged. To adjust the tread laterally inwardly, the assemblies 72 on the same side as the disengaged steering clutch are disengaged. With reference now to FIGURES 8 through 10, and first to FIGURE 8, to adjust the right crawler assembly laterally inwardly, as viewed in that figure, the steering clutch 42 and the assemblies 72 adjacent thereto are disengaged. The lower works 20 is now driven to the position of FIGURE 9. Disengagement of the clutch 42 affects idling of the right crawler 66, so that the lower works 20 pivots about the right crawler, as indicated by the arrow E. The right crawler also pivots, but to a lesser degree, as indicated by the arrow F. As a result, the right crawler is adjusted laterally inwardly, as facilitated by a corresponding one of the telescoping assemblies 48 (not shown in these schematic illustrations). The assemblies 72 controlling the right crawler 66 and the clutch 42 are now once again engaged.

Adjusting the left crawler 66, as viewed in the drawings, laterally inwardly, involves the same procedure as just described, with the exception that the steering clutch 38 and the adjacent assemblies 72 are now disengaged. As a result, the lower works 20 pivots about the left crawler 66, as indicated by the arrow G, and, while the left crawler also pivots, it does so to a lesser extent, as indicated by the arrow H. Having now moved to the position of FIGURE 10, in which both crawlers 66 have been adjusted laterally inwardly, as facilitated by the telescoping assemblies 48, the clutch 38 and the corresponding assemblies 72 are again engaged.

What we claim as our invention is:

1. A method of stabilizing an industrial vehicle of the type having a plurality of transversely movable crawler assemblies, a car body carried by the crawler assemblies throughout the range of transverse movement thereof, a drive assembly having the plurality of steering clutches for selectively independently driving the crawler assemblies throughout the range of transverse movement thereof, and removable assemblies connecting the crawler assemblies to the car body, by increasing the tread thereof by steering by driving, said method comprising the steps of:

disengaging one of the plurality of steering clutches that cause the operation of one of the crawler assemblies;

relative simultaneously disengaging the removable assemblies structurally operatively associated with another of said crawler assemblies;

driving the other of said crawler assemblies;

enabling said car body to pivot about that one of said crawler assemblies controlled by said disengaged steering clutch, and enabling the other of said crawler assemblies to move outwardly of said car body when longitudinally adjustable assemblies disposed between said car body and said crawler assemblies longitudinally adjust as the car body pivots about said one crawler assembly; and repeating the above procedure to adjust the other of said crawler assemblies laterally outwardly of said car body.

2. A method of stabilizing an industrial vehicle of the type having a plurality of transversely movable crawler assemblies, a car body carried by the crawler assemblies throughout the range of transverse movement thereof, a drive assembly for selectively driving the crawler assemblies throughout the range of lateral adjustment thereof having a plurality of steering clutches for selectively independently driving the crawler assemblies, and removable assemblies connecting the crawler assemblies to the car body, by decreasing the tread thereof by steering by driving, said method comprising the steps of:

disengaging one of the plurality of steering clutches that cause the operation of a plurality of crawler assemblies;

relatively simultaneously disengaging at least some of the removable assemblies structurally operatively associated with said one crawler assembly;

driving the other of said crawler assemblies;

enabling said car body to pivot about that one of said crawler assemblies controlled by said disengaged steering clutch, and enabling said one crawler assembly to move laterally inwardly of said car body when longtiudinally adjustable assemblies disposed between the car body and said crawler assemblies longitudinally adjust as the car body pivots about said one crawler assembly; and repeating the above procedure to adjust the other of said crawler assemblies laterally inwardly of said car body.

3. A method of changing the tread width of a crawler type vehicle having a body, a plurality of crawler assemblies, means mounting the crawler assemblies for movement transversely of the direction of travel of the vehicle, and means for driving the crawler assemblies throughout the range of transverse movement thereof, the method comprising the step of moving a first assembly on one side of the vehicle transversely relative to the body by only driving a first assembly on one side of the vehicle relative to a second assembly on the other side of the vehicle.

4. The method of claim 3 wherein the vehicle comprises means for selectively fixing or freeing the body to the crawler assemblies, comprising the additional step of freeing one of the assemblies for transverse movement relative to the body prior to the driving step.

5. The method of claim 3 wherein the driving step comprises driving the first assembly at a more rapid rate than the second assembly.

6. The method of claim 3 wherein the driving step comprises driving the first assembly and not driving the second assembly.

7. The method of claim 3 wherein the vehicle comprises means for selectively fixing or freeing the body to the crawler assemblies comprising the additional step of freeing the first assembly for transverse movement relative to the body prior to the driving step and wherein the driving step comprises driving the first assembly relative to the second assembly on the other side of the vehicle.

8. The method of claim 7 comprising the steps of fixing the first assembly relative to the body after the driving step, then freeing the second assembly for movement from the body and then driving the second assembly relative to the first assembly.

9. The method of claim 3 wherein the vehicle comprises means for selectively fixing or freeing the body to the crawler assemblies, comprising the additional step of freeing the second assembly for transverse movement relative to the body prior to the driving step.

10. The method of claim 9 comprising the steps of fixing the second assembly relative to the body after the driving step, then freeing the first assembly for transverse movement relatively to the body and then driving the second assembly relative to the first assembly.

11. A method of changing the tread width of a crawler type vehicle comprising a body and a plurality of crawler assemblies having a crawler frame supported by the body for movement thereon diverging from the direction of travel of the vehicle and an endless track drivable throughout the range of diverging movement of the crawler frame, the method comprising the steps of freeing one of the crawler frames for transverse movement relative to the body and then driving a first assembly on one side of the vehicle relative to a second assembly on the other side of the vehicle.

References Cited

UNITED STATES PATENTS

| | | | |
|---|---|---|---|
| 1,758,584 | 5/1930 | Rarig | 180—75 X |
| 2,324,681 | 7/1943 | Dekker. | |
| 2,618,349 | 11/1952 | Ludema | 180—9.48 |
| 2,681,231 | 6/1954 | Kondracki | 180—9.48 |
| 2,693,392 | 11/1954 | Grosch. | |
| 2,763,330 | 9/1956 | Potter | 180—9.48 |
| 3,048,443 | 8/1962 | O'Donnell et al. | |

LEO FRIAGLIA, *Primary Examiner.*

J. A. PEKAR, *Assistant Examiner.*

U.S. Cl. X.R.

180—9.48

UNITED STATES PATENT OFFICE
CERTIFICATE OF CORRECTION

Patent No. 3,416,622                                                      December 17, 1968

Percy R. Helm et al.

It is certified that error appears in the above identified patent and that said Letters Patent are hereby corrected as shown below:

In the heading to the printed specification, lines 3 and 4, "Percy R. Helm, Rte. 4, and Carl O. Lewis, 1009 N. 12th St., both of Manitowoc, Wis. 54220" should read -- Percy R. Helm and Carl O. Lewis, both of Manitowoc, Wis., assignors to the Manitowoc Company, Inc., Manitowoc, Wisconsin, a corporation of Wisconsin --.

Signed and sealed this 31st day of March 1970.

(SEAL)
Attest:

Edward M. Fletcher, Jr.                              WILLIAM E. SCHUYLER, JR.
Attesting Officer                                                Commissioner of Patents